No. 618,190. Patented Jan. 24, 1899.
G. F. STURGESS.
CHAIN GEAR.
(Application filed Oct. 4, 1897.)

(No Model.)

Witnesses.
Thomas Scott.
Thomas Sidney Mouler.

Inventor.
George Frederick Sturgess.

THE NORRIS PETERS CO., PHOTO-LITHO., WASHINGTON, D. C.

UNITED STATES PATENT OFFICE.

GEORGE FREDERICK STURGESS, OF LEICESTER, ENGLAND.

CHAIN-GEAR.

SPECIFICATION forming part of Letters Patent No. 618,190, dated January 24, 1899.

Application filed October 4, 1897. Serial No. 653,998. (No model.)

*To all whom it may concern:*

Be it known that I, GEORGE FREDERICK STURGESS, hosier's engineer, a subject of the Queen of England, residing at the Inglenook, Leicester, in the county of Leicester, England, have invented a new Chain-Gear, of which the following is a specification.

This invention has for its object to provide a differential gear more simple and efficient and more readily applied than those used heretofore; and it consists of internal and external sprocket-wheels connected by an endless roller-chain differing from the number of teeth in the sprocket-wheels by one tooth or link and a cam-track to carry the chain, the construction of which allows of a chain having one tooth more than the internal sprocket and one tooth less than the external sprocket, mounted round a common center of action, in such a manner that the parts can rotate together or independently and at different times and in opposite directions, as required.

Figure 1:
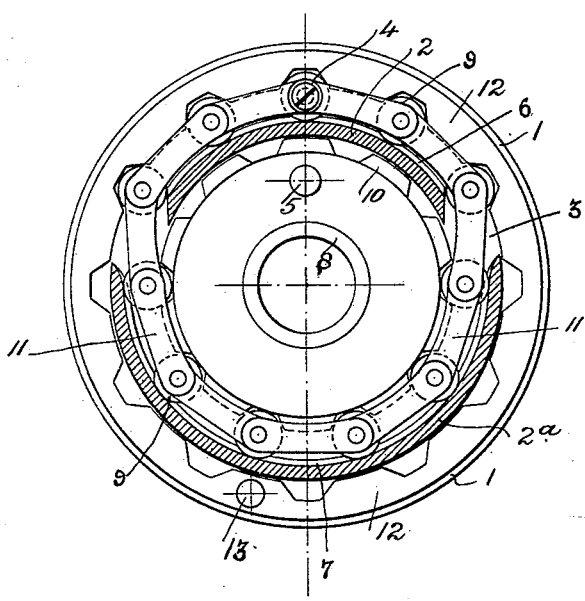
Figure 2:
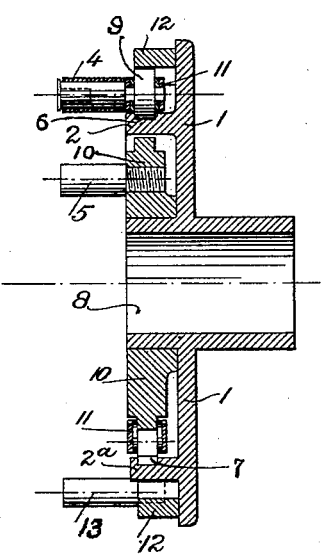

Figure 1 is an elevation, partly in section; and Fig. 2 is a cross-section of the chain-gear complete.

I might here say that either of the sprocket-wheels is dispensed with as required, according to the uses to which the gear is put.

Referring to said figures, the chain-holder or cam-track consists of a flanged disk 1, having apertures 3 and 3$^a$ cut in the flange, making an arc of a circle 2 on one side and an arc of a circle 2$^a$ on the other side of the central boss 8, eccentric to each other. Arc 2 has a groove or race 6 in its outer face, and arc 2$^a$ has a similar race 7 in its inner face, in which the rollers 9 of the chain 11 run when the cam-track or chain is retarded, whereby the chain 11 passes in and out of the chain-holder and is allowed to run on the outside of the arc 2 and mesh with wheel 12 and on the inside of the arc 2$^a$ and mesh with wheel 10, so as to transmit motion from one sprocket-wheel to the other. Either of the arcs may be dispensed with, according to the uses to which the gear is put. The arcs are made concentric to the boss 8, (in order to accommodate the dimensions of the other parts,) their extremities being necessarily beveled or terminating in a curve, thereby making a cam-track that imparts to the chain a movement eccentric to the axis of the gear. The size and shape of the arcs are determined by the distance between the sprockets and the length of the chain used, and, therefore, in case the external sprocket is of such diameter as to require it, the curves or bevels of the extremities of arc 2 are extended in order to carry the chain into engagement with the external sprocket, and make the arc 2 more eccentric than concentric to the axis of the gear. The sprocket-wheels and chain may have any number of teeth, providing the chain differs from one of the sprocket-wheels by at least one tooth or link. For the purpose of this specification the chain 11 has eleven links and roller-stop 4 and engages the internal sprocket-wheel 10, which has ten teeth and stop-pin 5 and engages the external sprocket-wheel 12, which has twelve teeth and stop-pin 13. The whole gear is mounted round the boss 8 of the cam track or disk 1, and by this construction of the cam-track the minimum difference between the sprocket-wheels 10 and 12 and chain 11—namely, a variation of one tooth or link—is obtained.

It is understood that any part of this gear can be connected up or attached to any part of machinery, and assuming that the gear was applied to hoisting, windlass, or other machinery in which slow advancement or great power is required then the chain 11 is retarded or held stationary by suitable stop means being thrown in the way of roller-stop 4 and the cam-track 1 revolves, causing each link of the chain to engage with the sprocket-wheels alternately, with the result that to every rotation of the cam-track 1 the internal sprocket 10 recedes one tooth and the external sprocket 12 advances one tooth in relation to the chain, owing to the latter having one tooth more and the former one tooth less than the total number of links in the chain 11. In the rotation or passage of the cam-track 1 the links of the chain 11 undulate as a snake, as it were, each link engaging the sprockets alternately. The stop means allow the roller-stop 4 to reciprocate radially, and the sprocket-wheels have an intermittent movement, advancing one tooth each time the part 2 of the eccentric cam-track passes the roller-stop 4. This motion will be better understood when I say that if the chain and sprocket-wheels corresponded in number of teeth and links neither sprocket-wheel would advance, as the links would simply register with the same teeth at every rotation of the cam-track.

When a regular motion is required, the external sprocket-wheel is stopped, the chain liberated, and the eccentric disk driven, causing the internal sprocket-wheel to move, or the internal sprocket-wheel is stopped, the chain liberated, and the eccentric disk driven, causing the external sprocket-wheel to move. Assuming the internal sprocket 10 to be retarded by suitable stop means engaging the stop-pin 5, to every rotation of the cam-track 1 in either direction the chain 11 will advance one link and the external sprocket 12 two teeth in the same direction with a continuous and regular movement. Assuming the external sprocket 12 to be retarded by suitable stop means engaging the stop-pin 13, to every rotation of the cam-track 1 in either direction the chain 11 will recede one link and the internal sprocket 10 two teeth in the opposite direction to the cam-track 1. It will be noticed that when a sprocket-wheel is driven and the cam-track is retarded the other sprocket-wheel advances at a greater speed than when the chain is retarded and the cam-track driven, as before referred to. Assuming the cam-track 1 to be retarded and the internal sprocket 10 to be driven, for every rotation of the internal sprocket 10 in either direction the external sprocket 12 would advance ten teeth, and by liberating the cam-track 1 while the driven internal sprocket is still rotated the whole gear would rotate round the common center of motion in keeping with the driven sprocket. Assuming the cam-track 1 to be retarded and the external sprocket 12 to be driven, to every rotation of the external sprocket the internal sprocket would rotate or advance twelve teeth—that is, one complete rotation and two teeth—and by releasing the cam-track 1 the whole gear would rotate round the common center of motion in keeping with the driven external sprocket. Therefore, taking the internal sprocket 10 to be the sprocket on the driving-wheel of a cycle, motor-car, counter-shaft, lathe, or other moving machinery and the external sprocket 12 to be the driven part, it will be seen that the said moving machinery can be driven at a slow speed when the eccentric cam-track 1 is allowed to rotate and at a faster speed when the eccentric cam-track 1 is stopped.

By using a roller-chain the friction of the chain over the cam-track is greatly reduced and the gear made so compact as to be of practical application and utility to mechanics generally. I have shown one form without attempting to show the many ways of making, applying, and using my invention.

Having thus fully described my invention, what I claim, and desire to secure by Letters Patent, is—

1. A differential gear comprised of an endless chain, a plurality of sprocket-wheels and a chain-holder, mounted round a common center of motion, the parts adapted to rotate together with the driven part, and means whereby one part may be retarded independently of the driven part causing the chain to transmit motion from one sprocket-wheel to the other, and another part to travel at a different speed to the driven part, substantially as and for the purposes set forth.

2. A differential gear comprised of a chain, sprocket-wheels and a cam-track, serving to engage the chain with the sprocket-wheels, mounted to operate round a common center of motion, the chain provided with rollers to reduce friction, the cam-track provided with a race to receive the rollers, and hold them in engagement with the sprocket-wheels, and means operating to impart a plurality of speeds, substantially as and for the purposes set forth.

3. A differential gear comprised of a chain, sprocket-wheels and a cam-track serving to connect the sprocket-wheels, mounted to operate round a common center of motion, means whereby the chain rides upon the inside of the cam-track, one side of the common center of motion so as to engage one sprocket-wheel, and upon the outside of the cam-track the other side of the common center of motion so as to engage the other sprocket-wheel, and means operating to impart a plurality of speeds, substantially as and for the purposes set forth.

4. A differential gear comprised of a chain, sprocket-wheels and a cam-track or chain-holder, serving to engage the chain with the sprocket-wheels, mounted to operate round a common center of motion, each capable of movement and adapted to be retarded independently, means whereby the chain is retarded while the cam-track is driven, causing the sprockets to move in opposite directions at a different speed to the cam-track, means whereby the external sprocket-wheel is retarded while the cam-track is driven, causing the internal sprocket to move at a different speed to the cam-track, and means whereby the internal sprocket-wheel is retarded while the cam-track is driven causing the external sprocket-wheel to move at a different speed to the cam-track, means whereby the cam-track is retarded, while the external sprocket is driven causing the internal sprocket-wheel to move at a greater speed than the external sprocket-wheel, and means whereby the cam-track is retarded while the internal sprocket-wheel is driven, causing the external sprocket-wheel to move at a less speed than the internal sprocket-wheel, operating to give a plurality of speeds, substantially as and for the purposes set forth.

5. A differential gear comprised of an endless chain, a plurality of sprocket-wheels and a chain-holder mounted round a common center of motion, the parts adapted to rotate together with the driven part and means whereby one part may be retarded independently of the driven part, causing the chain to transmit motion from one sprocket-wheel to the other, and another part to travel at a different speed to the driven part, the chain-holder adapted to receive a chain varying in number of links from the teeth of the sprocket-wheels by one link, whereby the minimum difference of speed of the driving and driven parts is obtained, substantially as and for the purposes set forth.

6. A differential gear comprised of a chain, an internal and an external sprocket-wheel, and a cam-track or chain-holder serving to engage the chain with the sprocket-wheels, mounted to operate round a common center of motion, means whereby the chain is retarded causing the external sprocket to advance and the internal sprocket to recede in relation to the chain, substantially as and for the purposes set forth.

GEORGE FREDERICK STURGESS.

Witnesses:
T. S. SHOULER,
THOMAS SCOTT.